(12) United States Patent
Starkey et al.

(10) Patent No.: US 10,791,884 B2
(45) Date of Patent: Oct. 6, 2020

(54) AUTOMATIC PAPER TOWEL DISPENSER WITH LIDAR SENSOR

(71) Applicant: Bradley Fixtures Corporation, Menomonee Falls, WI (US)

(72) Inventors: Michael M. Starkey, Kent, OH (US); Jeremy Losaw, Charlotte, NC (US); Thomas J. Philpott, Fort Mill, SC (US)

(73) Assignee: Bradley Fixtures Corporation, Menomonee Falls, WI (US)

( * ) Notice: Subject to any disclaimer, the term of this patent is extended or adjusted under 35 U.S.C. 154(b) by 221 days.

(21) Appl. No.: 15/983,239

(22) Filed: May 18, 2018

(65) Prior Publication Data
US 2018/0333013 A1 Nov. 22, 2018

Related U.S. Application Data

(60) Provisional application No. 62/508,895, filed on May 19, 2017.

(51) Int. Cl.
*A47K 10/36* (2006.01)
*G01S 17/88* (2006.01)
*G01S 17/08* (2006.01)

(52) U.S. Cl.
CPC .............. *A47K 10/36* (2013.01); *G01S 17/08* (2013.01); *G01S 17/88* (2013.01); *A47K 10/3612* (2013.01); *A47K 2010/3668* (2013.01)

(58) Field of Classification Search
CPC ................ A47K 10/36; A47K 10/3612; A47K 2010/3668; G01S 17/08; G01S 17/88
See application file for complete search history.

(56) References Cited

U.S. PATENT DOCUMENTS

| 3,730,409 A | 5/1973 | Ratti |
| 4,106,684 A | 8/1978 | Hartbauer et al. |
| 4,688,751 A | 8/1987 | Valot |
| 4,721,265 A | 1/1988 | Hawkins |

(Continued)

FOREIGN PATENT DOCUMENTS

| WO | WO-2016/154512 A1 | 9/2016 |
| WO | WO-2016/204924 | 12/2016 |

OTHER PUBLICATIONS

International Search Report and Written Opinion regarding corresponding PCT Application No. PCT/US2018/033319, dated Oct. 25, 2018, 13 pps.

(Continued)

*Primary Examiner* — Michael E Gallion
(74) *Attorney, Agent, or Firm* — Foley & Lardner LLP

(57) ABSTRACT

An automatic paper towel dispenser includes a dispensing mechanism configured to dispense a paper towel, a light detection and ranging (LIDAR) sensor, and a controller in communication with the LIDAR sensor. The LIDAR sensor is configured to emit light toward an object within a detection region at a first time, detect the light reflected by the object at a second time, and calculate a time of flight of the light. The time of flight is an amount of time that elapses between the first time and the second time. The controller is configured to calculate a distance between the LIDAR sensor and the object based on the time of flight and actuate the dispensing mechanism based on the calculated distance.

20 Claims, 9 Drawing Sheets

(56) References Cited

U.S. PATENT DOCUMENTS

| | | |
|---|---|---|
| D303,610 S | 9/1989 | Mastandrea |
| D312,369 S | 11/1990 | De Luca et al. |
| D325,486 S | 4/1992 | Goldstein |
| 5,375,785 A | 12/1994 | Boone et al. |
| 5,452,832 A | 9/1995 | Niada |
| 5,558,302 A | 9/1996 | Jesperson |
| 5,623,880 A | 4/1997 | Kuntz |
| 5,651,384 A | 7/1997 | Rudrich |
| 5,669,576 A | 9/1997 | Moody |
| 5,924,617 A | 7/1999 | Lacount et al. |
| 5,979,822 A | 11/1999 | Morand et al. |
| 6,056,234 A | 5/2000 | Kim |
| 6,069,354 A * | 5/2000 | Alfano .................. A47K 10/36 242/563 |
| D430,999 S | 9/2000 | Lodi |
| 6,224,010 B1 | 5/2001 | Morand |
| 6,321,963 B1 | 11/2001 | Gracyalny et al. |
| 6,411,920 B1 | 6/2002 | McConnell et al. |
| 6,419,136 B2 | 7/2002 | Formon et al. |
| 6,460,798 B1 | 10/2002 | Haen et al. |
| 6,592,067 B2 | 7/2003 | Denen et al. |
| 6,695,246 B1 * | 2/2004 | Elliott .................... A47K 10/36 242/563 |
| 6,736,348 B1 | 5/2004 | Formon et al. |
| 6,820,785 B2 | 11/2004 | Kapiloff |
| 6,826,985 B2 | 12/2004 | Broehl |
| 6,854,684 B2 | 2/2005 | Byrd et al. |
| 6,892,620 B2 | 5/2005 | Kapiloff |
| D509,690 S | 9/2005 | Wolpert et al. |
| 6,977,588 B2 | 12/2005 | Schotz et al. |
| D515,566 S | 2/2006 | Hwang |
| D515,899 S | 2/2006 | Chan |
| 7,017,856 B2 | 3/2006 | Moody et al. |
| D518,350 S | 4/2006 | Hay |
| 7,084,592 B2 | 8/2006 | Rodrian |
| 7,182,288 B2 | 2/2007 | Denen et al. |
| 7,182,289 B2 | 2/2007 | Moody et al. |
| 7,213,782 B2 | 5/2007 | Osborne et al. |
| 7,237,744 B2 * | 7/2007 | Morris .................... A47K 10/36 242/560.1 |
| D553,402 S | 10/2007 | Orgna et al. |
| 7,296,765 B2 | 11/2007 | Rodrain |
| 7,325,768 B2 | 2/2008 | Byrd et al. |
| 7,327,744 B2 | 2/2008 | Agrawal et al. |
| 7,354,015 B2 | 4/2008 | Byrd et al. |
| D568,655 S | 5/2008 | Friesen et al. |
| 7,387,274 B2 | 6/2008 | Moody et al. |
| 7,398,944 B2 * | 7/2008 | Lewis .................... A47K 10/36 242/563 |
| 7,416,152 B2 | 8/2008 | Wieser et al. |
| D582,242 S | 12/2008 | Bryan |
| 7,523,885 B2 * | 4/2009 | Lewis .................... A47K 10/36 242/563 |
| 7,594,622 B2 | 9/2009 | Witt et al. |
| 7,698,980 B2 | 4/2010 | Morris et al. |
| 7,783,380 B2 | 8/2010 | York et al. |
| D623,452 S | 9/2010 | McNeely et al. |
| 7,793,882 B2 | 9/2010 | Reinsel et al. |
| 7,878,446 B2 | 2/2011 | Reinsel et al. |
| 7,896,196 B2 | 3/2011 | Wegelin et al. |
| 7,931,228 B2 | 4/2011 | Omdoll |
| 7,984,872 B2 | 7/2011 | Kuehneman et al. |
| 7,987,756 B2 | 8/2011 | Lewis et al. |
| 7,996,108 B2 | 8/2011 | Yardley |
| D644,468 S | 9/2011 | Hansen |
| D654,741 S | 2/2012 | Hansen |
| 8,113,483 B2 | 2/2012 | Bayley et al. |
| D656,348 S | 3/2012 | Velazquez et al. |
| D657,984 S | 4/2012 | Hansen |
| 8,162,252 B2 | 4/2012 | Cittadino et al. |
| 8,186,551 B2 | 5/2012 | Morris et al. |
| 8,224,480 B2 | 7/2012 | Mok et al. |
| D664,796 S | 8/2012 | Cattacin et al. |
| D666,038 S | 8/2012 | Wilkins et al. |
| D668,484 S | 10/2012 | Velazquez et al. |
| 8,297,160 B2 | 10/2012 | Friesen et al. |
| D674,223 S | 1/2013 | Green et al. |
| 8,382,026 B2 | 2/2013 | Keily et al. |
| D687,651 S | 8/2013 | Niada |
| 8,528,851 B2 | 9/2013 | Friesen et al. |
| D699,048 S | 2/2014 | Paal et al. |
| D699,470 S | 2/2014 | Pasquini |
| 8,684,297 B2 | 4/2014 | Moody et al. |
| 8,777,149 B2 | 7/2014 | Goeking et al. |
| 8,789,787 B2 | 7/2014 | Kling et al. |
| 8,796,624 B2 | 8/2014 | Mok et al. |
| 8,807,475 B2 | 8/2014 | Rodrian et al. |
| 8,882,021 B2 | 11/2014 | Cittadino et al. |
| 8,919,688 B2 | 12/2014 | Kuehneman et al. |
| 8,960,588 B2 * | 2/2015 | Byrd .................... A47K 10/36 242/598.6 |
| 9,027,871 B2 | 5/2015 | Kuehneman et al. |
| 9,066,639 B2 | 6/2015 | Hagleitner |
| 9,068,326 B2 | 6/2015 | Chen et al. |
| 9,144,352 B2 | 9/2015 | Cittadino et al. |
| 9,167,941 B2 * | 10/2015 | Cittadino ............... A47K 10/36 |
| 9,248,988 B2 | 2/2016 | Keily et al. |
| 9,345,367 B2 | 5/2016 | Keily et al. |
| 9,370,283 B2 | 6/2016 | Fellhoelter |
| 9,446,924 B2 | 9/2016 | Omdoll |
| D769,016 S | 10/2016 | Achton |
| D773,202 S | 12/2016 | Madsen et al. |
| 9,524,604 B2 | 12/2016 | Erb |
| 9,645,561 B2 | 5/2017 | Borke et al. |
| D789,111 S | 6/2017 | Terrill et al. |
| D792,122 S | 7/2017 | Hagleitner |
| 9,701,508 B2 | 7/2017 | Diamond |
| D795,607 S | 8/2017 | Gottschalk |
| 9,770,143 B2 | 9/2017 | Corley et al. |
| 9,918,597 B2 | 3/2018 | Rubenson et al. |
| 9,999,326 B2 * | 6/2018 | Borke ................ A47K 10/3612 |
| D839,021 S | 1/2019 | Green |
| 2002/0134881 A1 | 9/2002 | Hoernig |
| 2006/0102769 A1 | 5/2006 | Wieser et al. |
| 2007/0176041 A1 | 8/2007 | Friesen et al. |
| 2008/0048064 A1 | 2/2008 | Lemaire et al. |
| 2009/0302727 A1 | 12/2009 | Vincent et al. |
| 2010/0243696 A1 | 9/2010 | Friesen et al. |
| 2010/0286818 A1 | 11/2010 | Goeking et al. |
| 2011/0068215 A1 | 3/2011 | Troutman et al. |
| 2011/0163056 A1 | 7/2011 | Domenig et al. |
| 2011/0210198 A1 | 9/2011 | Case et al. |
| 2012/0097790 A1 | 4/2012 | Wilkins et al. |
| 2012/0312853 A1 * | 12/2012 | Osborne .................. B26F 3/02 225/10 |
| 2013/0043266 A1 | 2/2013 | Hagleitner |
| 2013/0119183 A1 | 5/2013 | Cattacin et al. |
| 2014/0217117 A1 | 8/2014 | Mirbach |
| 2014/0263703 A1 | 9/2014 | Waitlevertch et al. |
| 2015/0289730 A1 | 10/2015 | Keily et al. |
| 2015/0305578 A1 | 10/2015 | Keily et al. |
| 2015/0374181 A1 | 12/2015 | Morand |
| 2016/0331192 A1 | 11/2016 | Rubenson et al. |
| 2016/0353946 A1 * | 12/2016 | Osborne, Jr. ......... B65H 16/005 |
| 2017/0042390 A1 * | 2/2017 | Rubenson ............. A47K 10/44 |
| 2017/0042391 A1 | 2/2017 | Morand |
| 2017/0188760 A1 | 7/2017 | Henson et al. |
| 2018/0177348 A1 * | 6/2018 | Swanson ............ A47K 10/3625 |
| 2018/0263434 A1 | 9/2018 | Babikian et al. |
| 2019/0014956 A1 | 1/2019 | Chang |

OTHER PUBLICATIONS

Invitation to Pay Additional Fees, Search Report and Written Opinion regarding PCT/US2019/032451 dated Aug. 16, 2019, 15 pps.

* cited by examiner

AUTOMATIC PAPER TOWEL DISPENSER WITH LIDAR SENSOR

CROSS-REFERENCE TO RELATED PATENT APPLICATION

This application claims the benefit of and priority to U.S. Provisional Patent Application No. 62/508,895 filed May 19, 2017, the entire disclosure of which is incorporated by reference herein.

BACKGROUND

The present disclosure relates generally to an automatic paper towel dispenser and more particularly to an automatic paper towel dispenser with a light detection and ranging (LIDAR) sensor to facilitate touch-free operation.

Paper towel dispensers, for hand drying, have been commercially available for many years. Some paper towel dispensers are designed to dispense flat folded paper towels, whereas other paper towel dispensers are designed to dispense paper towels from a continuous roll. Dispensers designed to handle continuous rolls of paper employ two primary methods of operation: manual and electronic. Manual dispensers rely on the user acting on a mechanism to advance the paper out of the dispenser. Conversely, electronic dispensers typically use an electric motor in combination with a paper feeding mechanism to dispense the paper.

Automatic electronic dispensers typically use one of two schemes for the delivery of paper. The first avoids complexity by exposing a sheet length of paper towel to be ripped off by a user. When the sheet is ripped off, another is immediately dispensed, ready for use. The second scheme is more complex, as paper is only dispensed upon request by the user. In these electronic dispensers, a hand wave sensor and associated circuitry can be used to detect that the user is requesting paper, without touching the dispenser.

Existing paper towel dispensers typically use two main hand wave sensor technologies: infrared reflectance (IR) and capacitive field. IR sensors measure the amount and characteristics of light reflected back to the sensor from the user's hand. Capacitive sensors produce an electromagnetic field about an antenna and measure the fluctuations and disruptions of the field to determine the presence of the user's hand. Both sensing technologies have their strengths and inherent weaknesses, especially when the user and use environments are taken into consideration.

The underlying concept in most of the IR detectors is reading the reflectance of a surface. Other methods will shine the infrared emitter directly onto the detector and look for the contact to be broken or interrupted. This type of detection is more often used in the internals of a mechanism, or in industrial automation applications. The interference method is also much more accurate and far less susceptible to variations in the surface reflecting the emitted light.

Paper towel dispensers that employ an IR hand wave sensor typically utilize the most basic implementation of and IR sensor, an emitter/detector pair. The emitter and the detector are spaced apart from each other facing generally the same direction. Lenses can be employed to direct the path of light and to help tune the distance to which the detector is most sensitive. In some circumstances, multiple sets of emitters and detectors may be used. By employing additional emitters and detectors, the field to which an object is sensed can be altered and optimized. Zones can be established for increasing the reliability. The additional sensors also allow for averaging and increased reliability.

Unfortunately, while the IR sensor generally performs sufficiently in many dispensers, and other applications, there are a variety of shortcomings to overcome. First, various sources of infrared lights exist, both naturally occurring and produced by other consumer and commercial products. This light can cause false detections and dispenses. As a result, signal processing methods have been developed to mitigate the effects of the environment. Second, each user's hand can reflect very different amounts and wavelengths of light back to the detector. Variables such as skin color, lotion use, and dirt or stains on the skin, can all prevent an IR sensor from working as intended. Third, accidental dispenses (e.g., when a person enters a bathroom and walks past a dispenser) must be dealt with by reducing overall sensitivity. Fourth, an optical lens and/or transparent cover must be employed to provide an optical path between the sensor and the detection region. The optical lens or cover can easily become contaminated with dirt or debris, rendering the sensor useless or producing false detections. Lastly, due to changing variables, user selectable hand detection distances are not achievable. Dispensers employing an IR sensor are tuned to detect a hand wave at a defined distance from the sensor location.

Capacitive hand wave sensors rely on the fact that the human body has an electrical capacitance and can disrupt fields of electromagnetic waves. An oscillator circuit varies the current to an antenna which results is a fluctuating electric field. When a human enters the near proximity of the oscillating field, the circuit can detect the change and mark a positive detection. This general principle is also used in other fields and may be referred to as radio detection. For example, the electronic musical instrument called the Theremin uses a similar principle to detect the presence of a user's hand nearby the instrument.

Capacitive sensors are typically much less susceptible to false detections within the installed environment of the dispenser. Unlike the IR sensor, a capacitive sensor will likely not be affected by a user passing at a substantial distance. Antennae design and signal processing are typically employed to reduce environmental effects and keep the detection range very localized to a controlled detection zone. Sunlight and other sources of spurious IR light will not affect a capacitive sensor. No optics exist and so there is no risk of dirt and debris contamination.

While capacitive sensors have proven to be an adequate solution in many commercially available paper towel dispensers, they do have several negative attributes. First, capacitive sensors are highly sensitive to electrostatic discharge and rely on accurate tuning and signal processing to make the detection. Second, in high electrostatic discharge environments, capacitive sensors can be easily damaged when static is discharged from a user's hand to the dispenser. Third, splashing of water onto the dispenser is also quite common. With significant buildup of water droplets, capacitive sensors can lose sensitivity. Fourth, sources of electromagnetic noise (e.g., the ballasts of fluorescent lights, oscillating at 60 Hz) can either reduce sensitivity or result in false detections and dispenses. Low cost dispensers that employ poorly tuned capacitive sensors can be frustrating for the user. They tend to have a poorly defined area where the user can wave their hand to request a dispense and very low repeatability and reliability. Lastly, it is possible to tune a capacitive sensor to detect a hand wave at various distances, but reliability beyond fairly close proximity is greatly diminished. As a result, dispensers employing a capacitive sensor are typically tuned to detect a hand wave at a defined distance from the sensor location. User-adjusted detection distance settings are not typically provided.

SUMMARY

One implementation of the present disclosure is an automatic paper towel dispenser. The paper towel dispenser includes a dispensing mechanism configured to dispense a paper towel, a light detection and ranging (LIDAR) sensor, and a controller in communication with the LIDAR sensor. The LIDAR sensor is configured to emit light toward an object within a detection region at a first time, detect the light reflected by the object at a second time, and calculate a time of flight of the light. The time of flight is an amount of time that elapses between the first time and the second time. The controller is configured to calculate a distance between the LIDAR sensor and the object based on the time of flight and actuate the dispensing mechanism based on the calculated distance.

In some embodiments, the controller is configured to compare the calculated distance to a minimum distance threshold and actuate the dispensing mechanism in response to a determination that the calculated distance is greater than the minimum distance threshold.

In some embodiments, the controller is configured to compare the calculated distance to a maximum distance threshold and actuate the dispensing mechanism in response to a determination that the calculated distance is less than the maximum distance threshold.

In some embodiments, the controller is configured to compare the calculated distance to a threshold range of distances and actuate the dispensing mechanism in response to a determination that the calculated distance is within the threshold range of distances.

In some embodiments, the paper towel dispenser includes an outer shell containing the dispensing mechanism, the LIDAR sensor, and the controller. In some embodiments, the dispensing mechanism, the LIDAR sensor, and the controller are part of an internal unit contained within the outer shell. The outer shell may include a window in a front surface of the outer shell. The window may include a hole or aperture, which may be empty or occupied by an optically transparent material (e.g., a transparent cover or lens). The LIDAR sensor may be configured to emit the light through the window in the outer shell and detect the reflected light returning through the window in the outer shell.

In some embodiments, the paper towel dispenser includes a circuit board. The LIDAR sensor may be mounted on the circuit board. In some embodiments, the paper towel dispenser includes a protective cover over the circuit board and the LIDAR sensor and a window in the protective cover. The LIDAR sensor may be configured to emit the light through the window in the protective cover and detect the reflected light returning through the window in the protective cover.

In some embodiments, the dispensing mechanism is configured to dispense the paper towel from a continuous roll of paper towels within the paper towel dispenser. In some embodiments, the dispensing mechanism includes one or more rollers configured to guide the paper towel to an opening in the paper towel dispenser.

Another implementation of the present disclosure is an automatic paper towel dispenser. The paper towel dispenser includes a dispensing mechanism configured to dispense a paper towel, a light detection and ranging (LIDAR) sensor, and a controller in communication with the LIDAR sensor. The LIDAR sensor is configured to emit light toward an object within a detection region at a first time, detect the light reflected by the object at a second time, and calculate a time of flight of the light. The time of flight is an amount of time that elapses between the first time and the second time. The LIDAR sensor is configured to calculate a distance between the LIDAR sensor and the object based on the time of flight. The controller is configured to actuate the dispensing mechanism based on the calculated distance.

In some embodiments, the controller is configured to compare the calculated distance to a minimum distance threshold and actuate the dispensing mechanism in response to a determination that the calculated distance is greater than the minimum distance threshold.

In some embodiments, the controller is configured to compare the calculated distance to a maximum distance threshold and actuate the dispensing mechanism in response to a determination that the calculated distance is less than the maximum distance threshold.

In some embodiments, the controller is configured to compare the calculated distance to a threshold range of distances and actuate the dispensing mechanism in response to a determination that the calculated distance is within the threshold range of distances.

Another implementation of the present disclosure is an automatic paper towel dispenser. The dispenser includes a dispensing mechanism configured to dispense a paper towel, a light emitter configured to emit light toward an object within a detection region at a first time, a light detector configured to detect the light reflected by the object at a second time, and a processing circuit. The processing circuit is configured to calculate a time of flight of the light. The time of flight is an amount of time that elapses between the first time and the second time. The processing circuit is configured to actuate the dispensing mechanism based on the calculated time of flight.

In some embodiments, the processing circuit is configured to calculate a distance to the object based on the time of flight and actuate the dispensing mechanism based on the calculated distance.

In some embodiments, the light emitter is configured to emit a focused beam or pulse of laser light. In other embodiments, the light emitter is configured to emit a beam or pulse of non-laser light.

In some embodiments, the processing circuit is configured to compare the calculated time of flight to a minimum time of flight threshold and actuate the dispensing mechanism in response to a determination that the calculated time of flight is greater than the minimum time of flight threshold.

In some embodiments, the processing circuit is configured to compare the calculated time of flight to a maximum time of flight threshold and actuate the dispensing mechanism in response to a determination that the calculated time of flight is less than the maximum time of flight threshold.

In some embodiments, the processing circuit is configured to compare the calculated time of flight to a threshold range of times and actuate the dispensing mechanism in response to a determination that the calculated time of flight is within the threshold range of times.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Overview

Referring generally to the FIGURES, an automatic paper towel dispenser with a light detection and ranging (LIDAR) sensor and components thereof are shown, according to various exemplary embodiments. In some embodiments, the paper towel dispenser is equipped with a mechanism to feed a continuous roll of paper towels and a LIDAR hand wave sensor. The LIDAR sensor may use a laser diode (or any other type of light emitter/detector) and associated circuitry to measure the time of flight (TOF) of the emitted light to and from a user's hand. From these measurements, the paper towel dispenser can calculate distance with a high degree of accuracy. Because the distance calculation is based on the time for some of the emitted light to be returned to the sensor, but is not concerned with the amount of light returned, many of the issues that affect standard IR sensors are eliminated. Even though the LIDAR sensor is measuring small amounts of time, it has proven to be highly accurate at determining distance. Even with various materials and coatings, the LIDAR sensor is able to accurately detect distance.

In some embodiments, the paper towel dispenser includes an outer shell and an internal module. The internal module can be affixed to the inside face of the outer shell. The outer shell may include a window which passes the emitted and reflected light from the LIDAR sensor. The window may include a hole or aperture, which may be empty or occupied by an optically transparent material (e.g., a transparent cover or lens). The LIDAR sensor may reside within the internal module and may be oriented along the midline of the module and overall unit. However, it is contemplated that the LIDAR sensor may be located anywhere on the unit to which the user interaction is desired. The sensing direction of the LIDAR sensor may be determined by the orientation of the circuit board which contains the LIDAR sensor. In some embodiments, the LIDAR sensor is oriented to emit light through the window on the front of the outer shell. Light emitted from the LIDAR sensor may pass out of the shell via the sensor window. When the light reflects off of an object, the reflected light passes back through the viewing window and is detected by the LIDAR sensor.

The paper towel dispenser may include a processing circuit coupled to the LIDAR sensor. The processing circuit can determine the TOF of the emitted light and calculate distance to the detected object based on the TOF. In some embodiments, the processing circuit can be calibrated to compensate for ranging offsets and optical distortion. If the calculated distance is within a predetermined detection range, the paper towel dispenser may automatically dispense a paper towel. These and other features and advantages of the paper towel dispenser are described in detail below.

Automatic Paper Towel Dispenser

Figure 1:
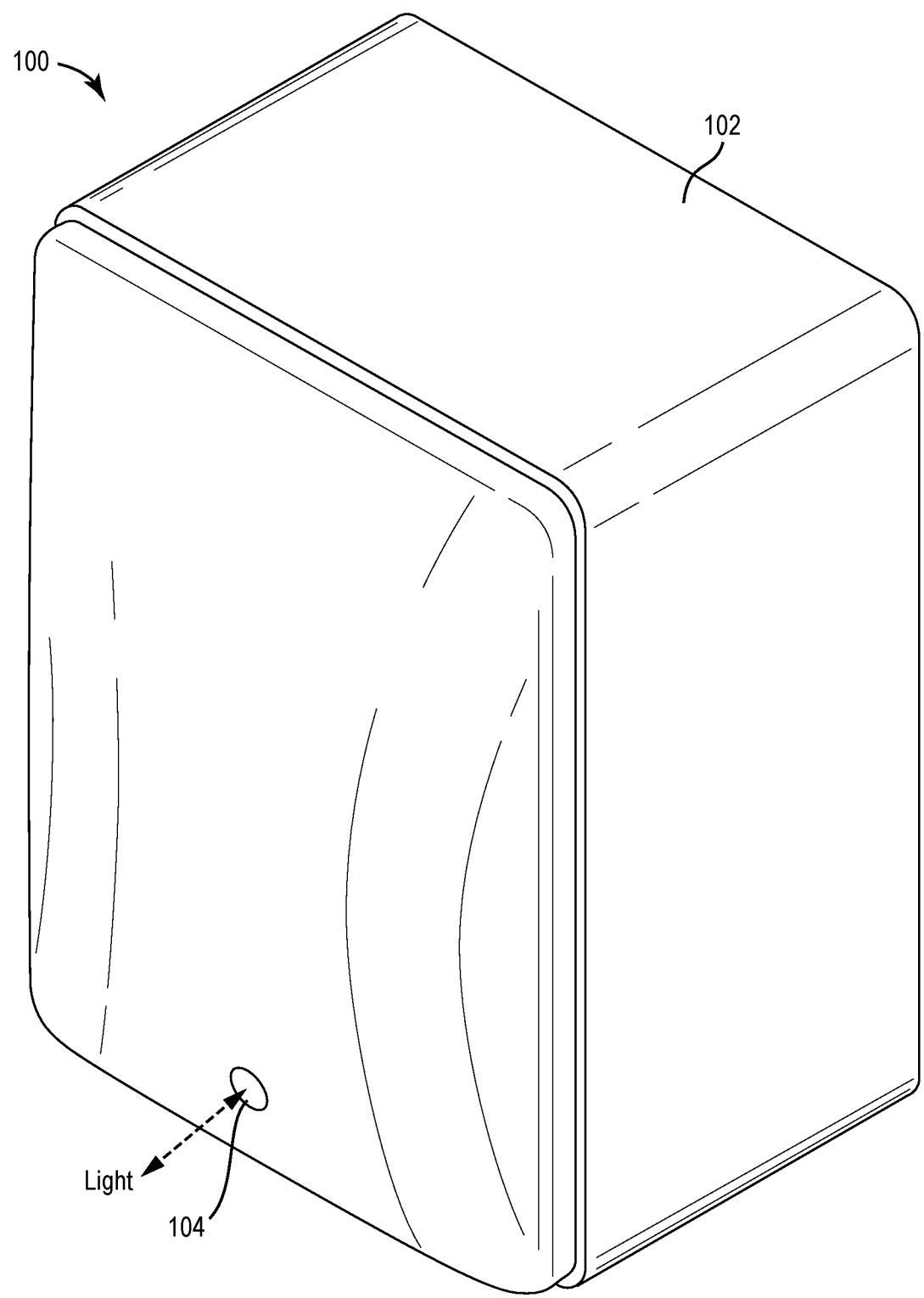
FIG. 1 is a perspective view of an automatic paper towel dispenser, according to an exemplary embodiment.
Figure 2:
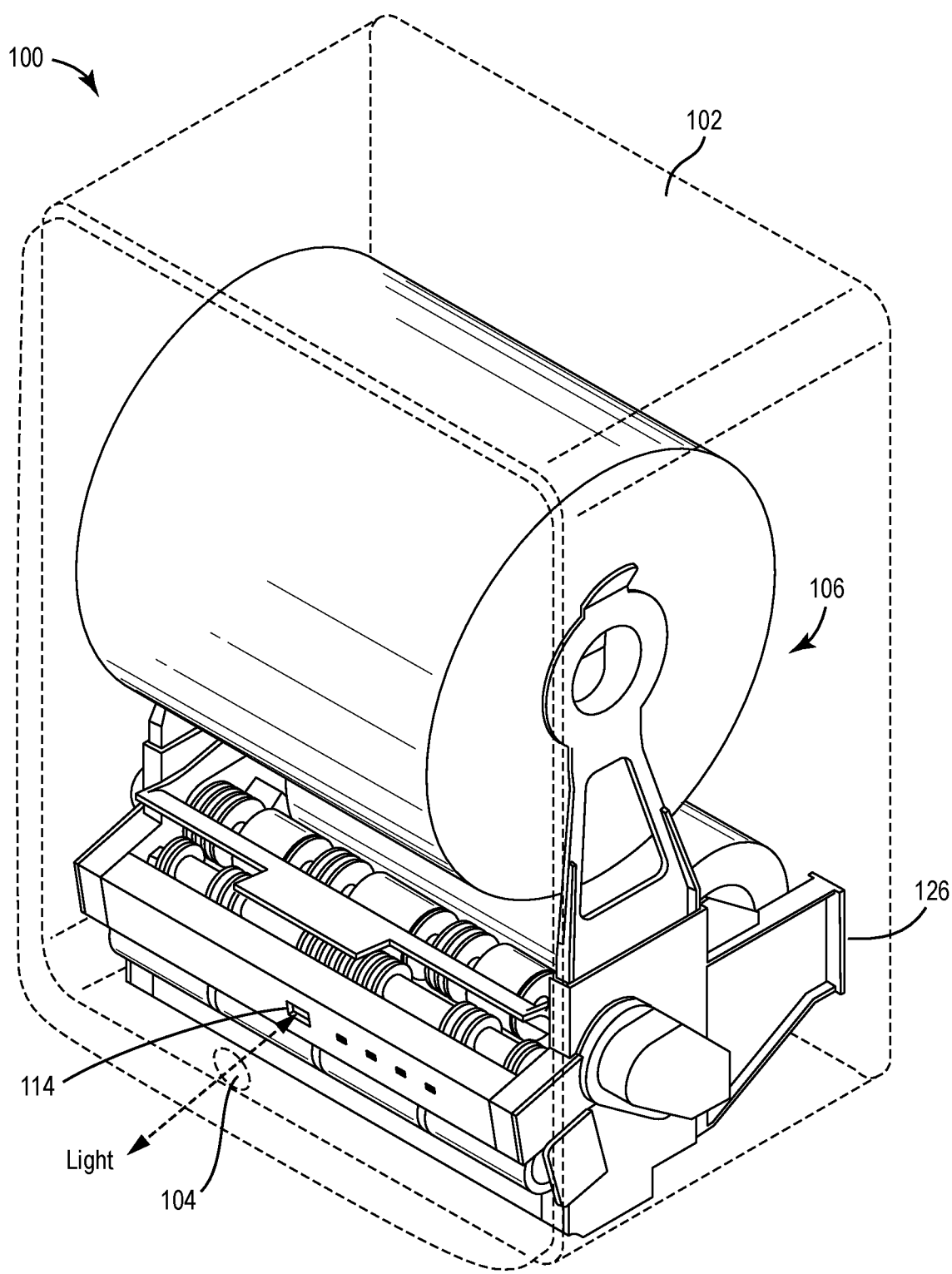
FIG. 2 is another perspective view of the paper towel dispenser of FIG. 1 with an outer shell made partially transparent to illustrate an internal module contained within the outer shell, according to an exemplary embodiment.

Referring now to FIGS. 1-2, a front perspective view of an automatic paper towel dispenser 100 is shown, according to an exemplary embodiment. In FIGS. 1-2, a front face of dispenser 100 (i.e., the curved surface) is oriented toward the left and forward, whereas the rear face of dispenser 100 is oriented toward the right and into the page. Dispenser 100 is shown to include an outer shell 102 and an internal module 106. In some embodiments, internal module 106 is affixed to an inside surface of the rear face of outer shell 102 at coupling points 126. The front face of outer shell 102 is shown to include a window 104 through which light emitted by an internal LIDAR sensor 114 can exit outer shell 102. In some embodiments, window 104 is a concave or convex lens configured to focus or spread the light emitted by LIDAR sensor 114. In other embodiments, window 104 may be a hole or aperture in outer shell 102 to allow the light emitted by LIDAR sensor 114 to pass therethrough. The light emitted by LIDAR sensor 114 may reflect off an object and pass back through window 104 toward LIDAR sensor 114.

Figure 3:
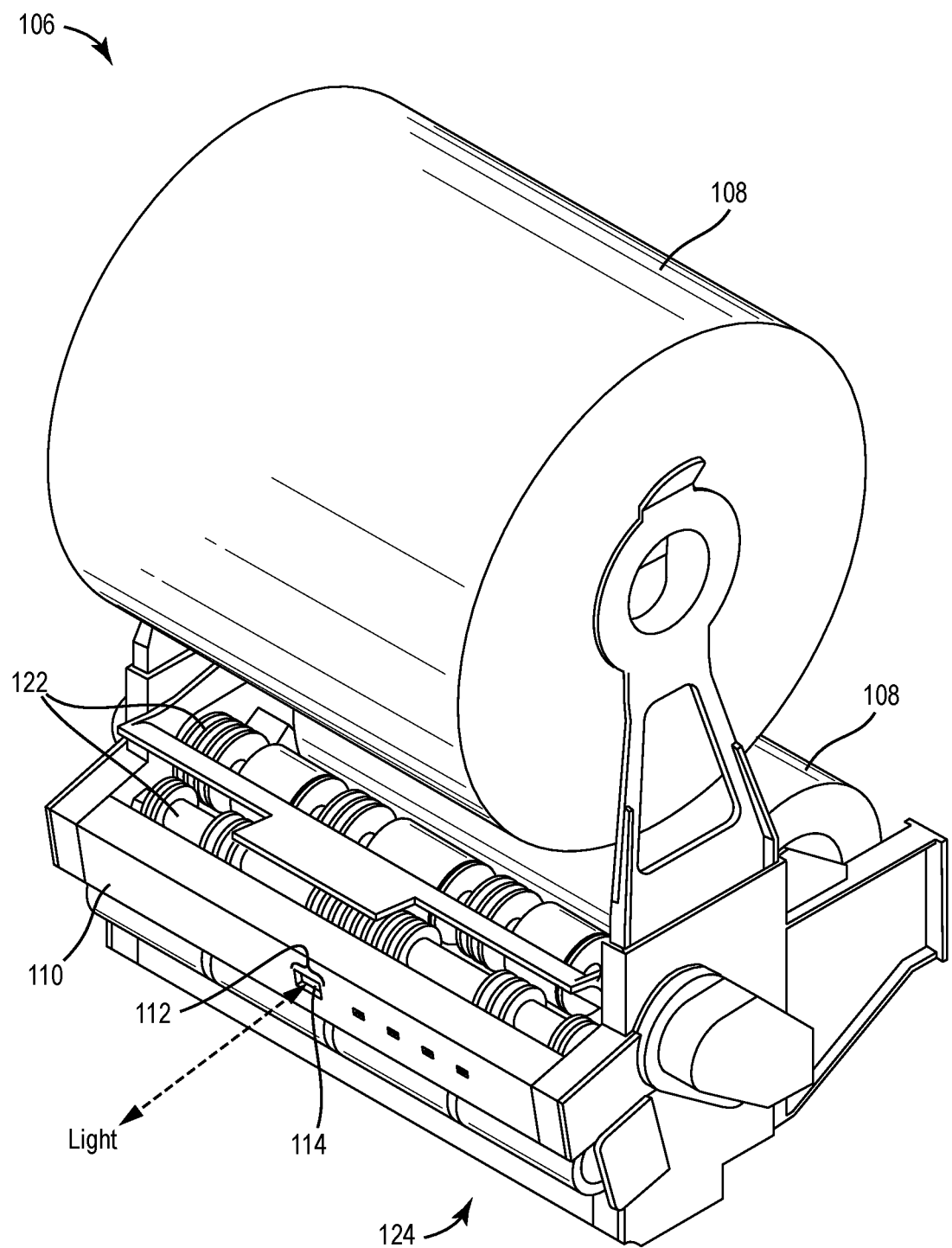
FIG. 3 is a perspective view of the internal module of FIG. 2, according to an exemplary embodiment.
Figure 4:
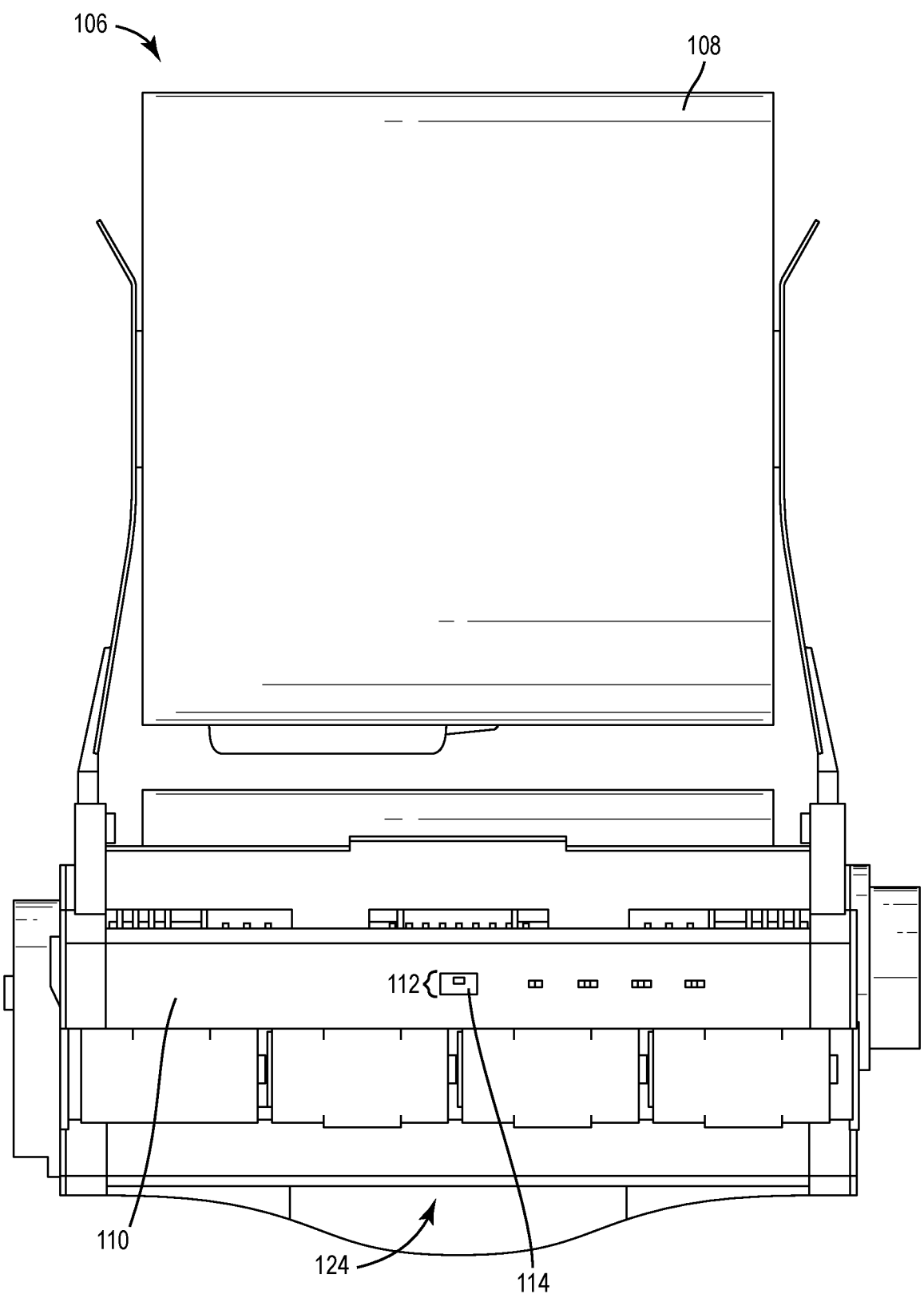
FIG. 4 is a front view of the internal module of FIG. 2, according to an exemplary embodiment.
Figure 5:
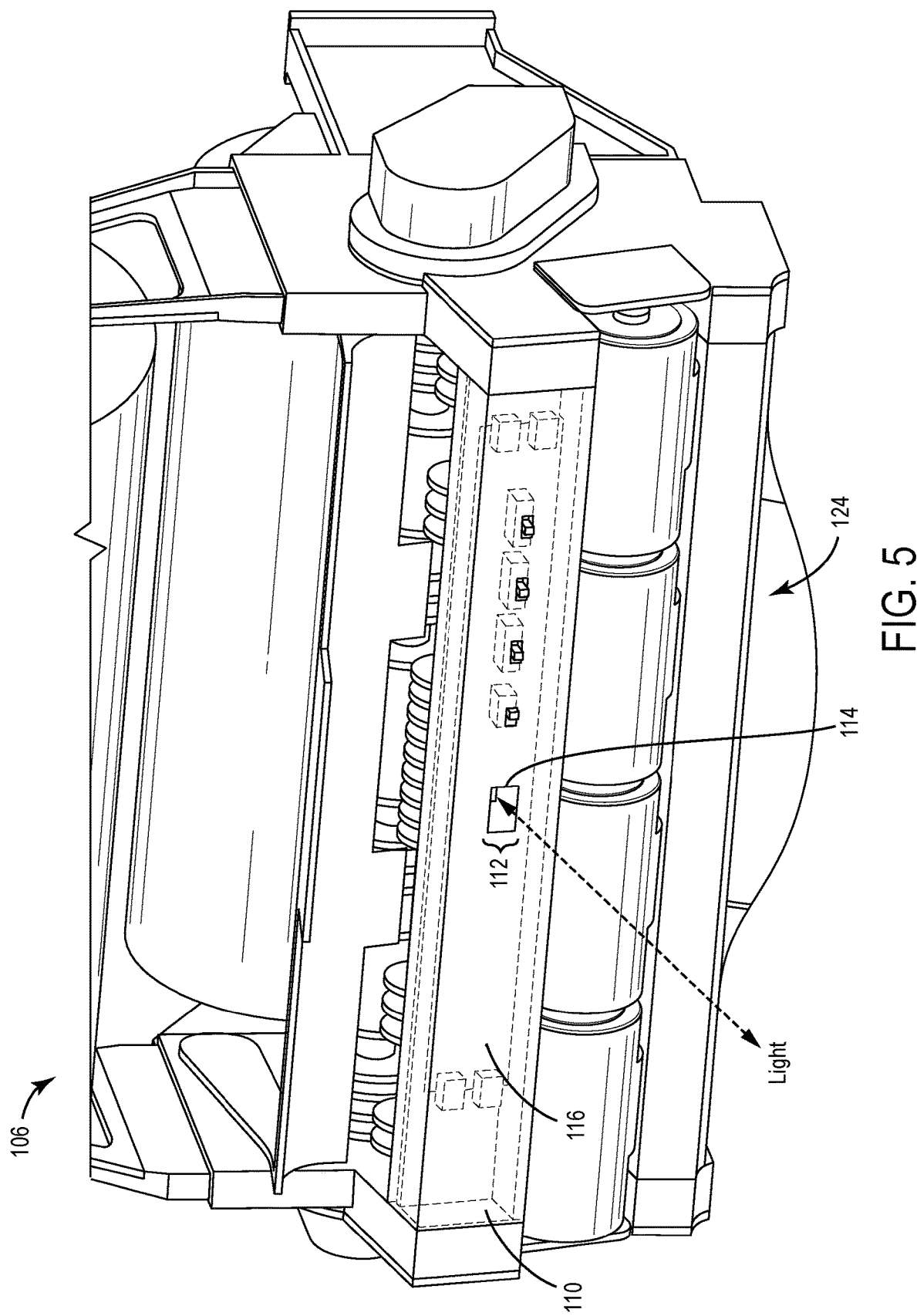
FIG. 5 is another perspective view of the internal module of FIG. 2 with a protective cover made partially transparent to illustrate a circuit board contained within the protective cover, according to an exemplary embodiment.
Figure 6:
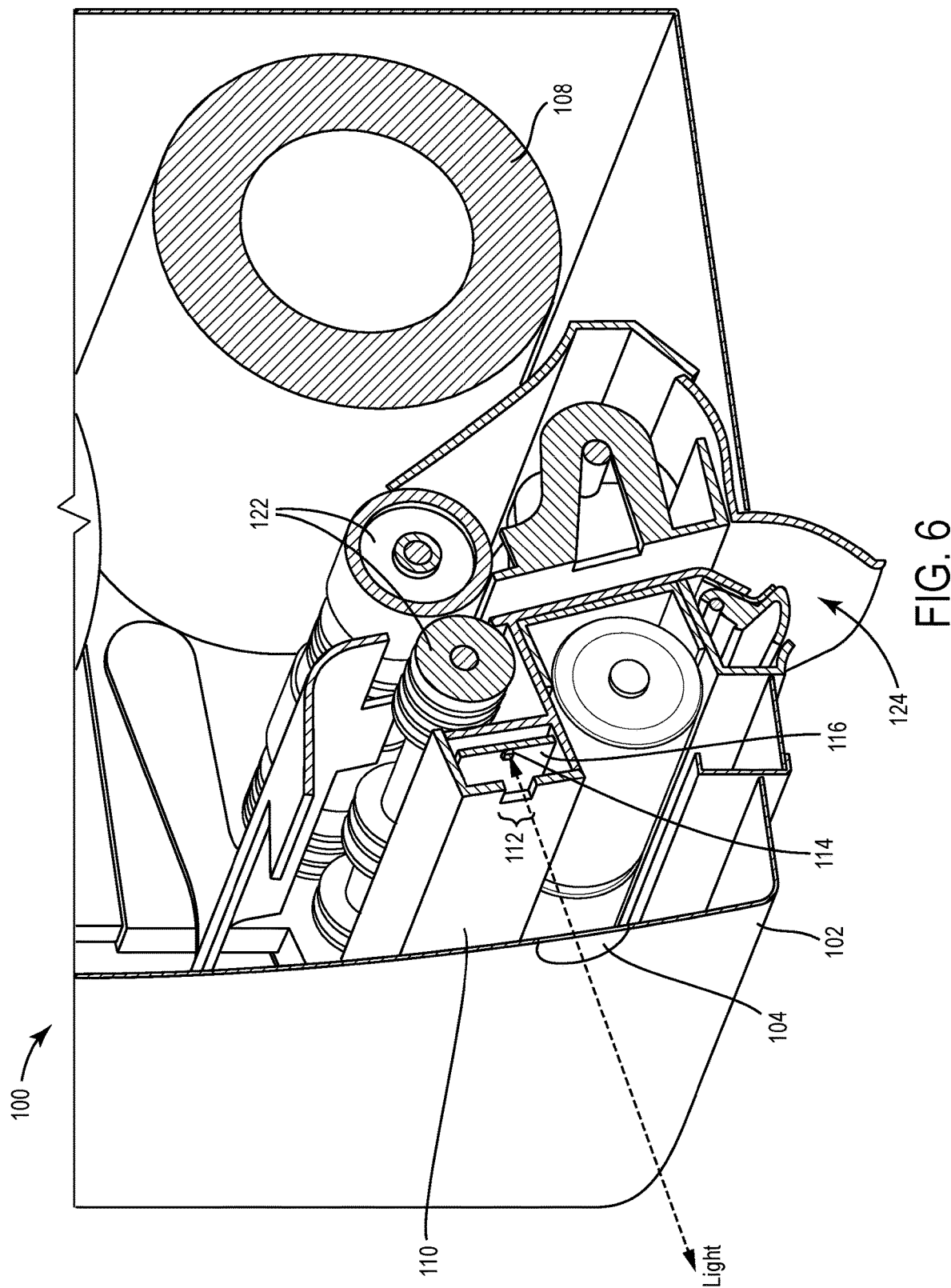
FIG. 6 is a cross-sectional view of the paper towel dispenser of FIG. 1, according to an exemplary embodiment.

Referring now to FIGS. 3-6, internal module 106 is shown in greater detail, according to an exemplary embodiment. FIG. 3 is a front perspective view of internal module 106, whereas FIG. 4 is a front view of internal module 106. FIG. 5 is a close-up perspective view of a portion of internal module 106. FIG. 6 is a perspective view of a cross-section of dispenser 100 taken along a vertical plane substantially parallel to the right and left sides of dispenser 100.

In some embodiments, internal module 106 is configured to hold one or more rolls of paper towels 108 and dispense paper towels 108 from a continuous roll. Although internal module 106 is designed primarily for continuous roll dispensing, it is contemplated internal module 106 can be modified to dispense flat folded paper towels or replaced with a different internal module configured to dispense flat folded paper towels without departing from the teachings of the present disclosure. Upon detecting an object in a detection region outside outer shell 102, internal module 106 can activate an internal motor or other actuation device configured to dispense paper towels 108. In some embodiments, internal module 106 includes a set of rollers 122 coupled to the motor or actuation device. Rollers 122 can be configured to guide paper towels 108 through internal module 106 and out a slot 124 at the bottom and near the front of internal module 106.

LIDAR sensor 114 resides within internal module 106 and can be oriented such that the light emitted by LIDAR sensor 114 is directed toward the detection region outside outer shell 102. In some embodiments, LIDAR sensor 114 is mounted on an internal circuit board 116 behind a protective cover 110. The light emitted by LIDAR sensor 114 may pass through a window 112 in protective cover 110 and through the front surface of outer shell 102 via window 104. The light may reflect off an object in the detection region and travel the reverse path through window 104 and window 112 back to LIDAR sensor 114. In some embodiments, window 112 contains a secondary lens configured to spread or focus the light emitted by LIDAR sensor 114. Alternatively, LIDAR sensor 114 can be mounted on outer shell 102 or coplanar with outer shell 102 such that window 112 and window 104 are not required.

In some embodiments, LIDAR sensor 114 can be mounted on a secondary circuit board (e.g., a daughter board) that communicates with circuit board 116. The secondary circuit board can located anywhere within outer shell 102 or attached to outer shell 102 to provide greater flexibility in the location of LIDAR sensor 114. In some embodiments, LIDAR sensor 114 is potted in a transparent potting material (e.g., epoxy, a solid or gelatinous compound, etc.) to provide protection for LIDAR sensor 114. The potting material can be bonded to circuit board 116, the secondary circuit board, or any other component of dispenser 100.

The sensing direction and the location of the detection region may be defined by the orientation and position of circuit board 116 and LIDAR sensor 114. In some embodiments, circuit board 116 and LIDAR sensor 114 are oriented primarily toward the front surface of dispenser 100 and slightly downward from horizontal (e.g., between 0° and 30° downward from horizontal, between 5° and 10° downward from horizontal, etc.). This orientation defines a detection region in front of dispenser 100, near the location of slot 124 at which paper towels 108 are dispensed. In some embodiments, LIDAR sensor 114 is located along a midline substantially equidistant from the left and right sides of dispenser 100. However, it is contemplated that LIDAR sensor 114 can be located anywhere on or within dispenser 100 and arranged in any orientation to define the detection region at any location at which user interaction is desired.

LIDAR Sensor Circuit

Figure 7:
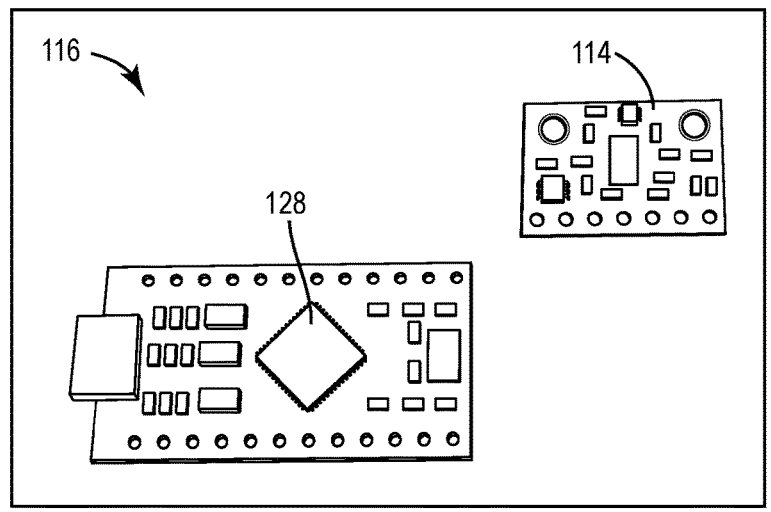
FIG. 7 is an image of a prototype sensor circuit including a LIDAR sensor and a controller, according to an exemplary embodiment.
Figure 8:
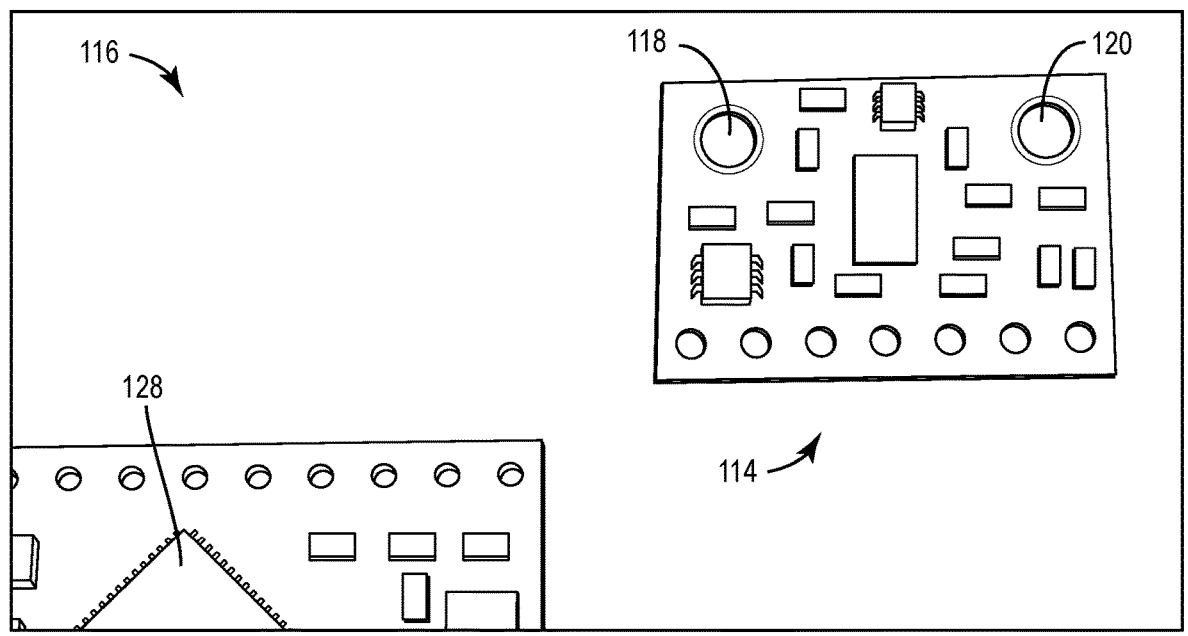
FIG. 8 is another image of the prototype sensor circuit of FIG. 7 illustrating the LIDAR sensor in greater detail, according to an exemplary embodiment.

Referring now to FIGS. 7-8, a prototype of circuit board 116 is shown in greater detail, according to an exemplary embodiment. Circuit board 116 may include LIDAR sensor 114 and a controller 128 configured to communicate with LIDAR sensor 114. Circuit board 116 and the components attached thereto (e.g., LIDAR sensor 114, a secondary circuit board, controller 128, etc.) form a processing circuit configured to perform the various calculations and control actions described below.

In some embodiments, LIDAR sensor 114 includes a light emitter 118 and a light detector 120. Light emitter 118 can be configured to emit a beam of focused light (e.g., a laser) to produce a pulse of light at a time $t_1$ specified by controller 128. The emitted light propagates through the environment until it reaches an object. Upon encountering the object, the light will be reflected off the surface of the object back toward LIDAR sensor 114. Light detector 120 detects the reflected light at a time $t_2$, subsequent to time $t_1$. The difference between $t_2$ and $t_1$ is known as the time of flight (TOF) of the light (i.e., TOF=$t_2-t_1$). In various embodiments, the TOF can be calculated by LIDAR sensor 114 or controller 128.

Controller 128 can use the TOF, along with the constant speed of light, to calculate the distance the light traveled to reach the reflecting object. For example, controller 128 can calculate the distance between LIDAR sensor 114 and the reflecting object using the equation:

$$d = \frac{TOF \cdot c}{2}$$

where d is the distance between LIDAR sensor 114 and the detected object, TOF is the time of flight of the emitted light (i.e., TOF=$t_2-t_1$), and c is the speed of light. The product of TOF and c is divided by two since the emitted light will cover the distance d in half the TOF and spend the remaining time returning to LIDAR sensor 114. It should be understood that this equation for the distance d is merely an example of how the distance d can be calculated and should not be regarded as limiting. In other embodiments, the distance d can be calculated using other equations, which may be more complex than the example provided above. In some embodiments, the distance d is calculated by LIDAR sensor 114 and provided as an output to controller 128.

The most significant benefit to measuring the TOF rather than the intensity of reflected light is the insensitivity to reflecting material. Almost all objects occurring naturally reflect some degree of light. By measuring TOF, LIDAR sensor 114 can accurately calculate distance regardless of the amount of reflected light that returns to LIDAR sensor 114 (as long as it is above the measurable threshold of LIDAR sensor 114). In contrast, conventional light sensors (e.g., IR sensors) typically measure the intensity of reflected light and register a positive detection if the intensity is above a threshold intensity. If an object within the detection region has very low reflectance, a conventional light sensor may fail to detect the object.

An additional benefit of measuring TOF is the ability to accurately determine distance. The speed of light c remains constant and by measuring the TOF of the light, the distance d can be accurately calculated by controller 128. In applications such as a paper towel dispenser, this principle can be used by controller 128 to distinguish nearby objects from distant objects. For example, the environment in which paper towel dispenser 100 is installed (e.g., a restroom) may include many objects moving in front of dispenser 100. It may be necessary for dispenser 100 to be able to detect a hand within a certain distance from dispenser 100 but disregard objects beyond that distance as they are likely not the hand of an individual requesting a paper towel. By calculating the distance d, controller 128 can accurately determine where the object is relative to dispenser 100 and can determine if the object is likely a hand rather than another object.

Although dispenser 100 is described primarily as having a LIDAR sensor 114, it is contemplated that LIDAR sensor 114 can be replaced with any other type of optical sensor configured to emit light and measure the TOF of the light reflected back to the sensor. The emitted light can be laser light or non-laser light having any wavelength or frequency. These and other variations in the nature of the emitted light and/or the type of sensor used to emit light and measure the TOF of the reflected light are within the scope of the present disclosure. Unlike conventional light sensors that measure the intensity of the reflected light, the optical sensor used in dispenser 100 measures the TOF of the reflected light. The TOF measured by the optical sensor can then be used by the optical sensor and/or by controller 128 to calculate the distance d, as previously described.

In some embodiments, controller 128 compares the calculated distance d to a predetermined range of distances. The range may be defined by a minimum distance $d_{min}$ threshold and a maximum distance threshold $d_{max}$. If the calculated distance d is within the predetermined range (i.e., $d_{min} \leq d \leq d_{max}$), controller 128 may actuate the dispensing mechanism of paper towel dispenser 100. However, if the calculated distance d is not within the predetermined range (i.e., $d < d_{min}$ or $d > d_{max}$), controller 128 may disregard the detected object and may not actuate the dispensing mechanism. The maximum distance threshold $d_{max}$ prevents dispenser 100 from dispensing a paper towel if the detected object is too far away (e.g., a person walking past dispenser 100), whereas the minimum distance threshold $d_{min}$ prevents dispenser 100 from dispensing a paper towel if the detected object is too close (e.g., light reflecting off the internal surface of window 104). In some embodiments, the minimum distance threshold $d_{min}$ is set to a value greater than the distance between LIDAR sensor 114 and window 104 such that the detection region is entirely external to dispenser 100.

In some embodiments, controller 128 determines whether to dispense a paper towel based on the calculated TOF. For example, controller 128 may compare the calculated TOF to a predetermined range of times. The range may be defined by a minimum time threshold $t_{min}$ and a maximum time threshold $t_{max}$. If the calculated TOF is within the predetermined range (i.e., $t_{min} \leq TOF \leq t_{max}$), controller 128 may actuate the dispensing mechanism of paper towel dispenser 100. However, if the calculated TOF is not within the predetermined range (i.e., $TOF < t_{min}$ or $TOF > t_{max}$), controller 128 may disregard the detected object and may not actuate the dispensing mechanism. The maximum time threshold $t_{max}$ prevents dispenser 100 from dispensing a paper towel if the detected object is too far away (e.g., a person walking past dispenser 100), whereas the minimum time threshold $t_{min}$ prevents dispenser 100 from dispensing a paper towel if the detected object is too close (e.g., light reflecting off the internal surface of window 104). In some embodiments, the minimum time threshold $t_{min}$ is set to a value greater than the time required for the emitted light to reflect off the internal surface of window 104 and return to LIDAR sensor 114 such that the detection region is entirely external to dispenser 100.

Sensor Testing

Figure 9:
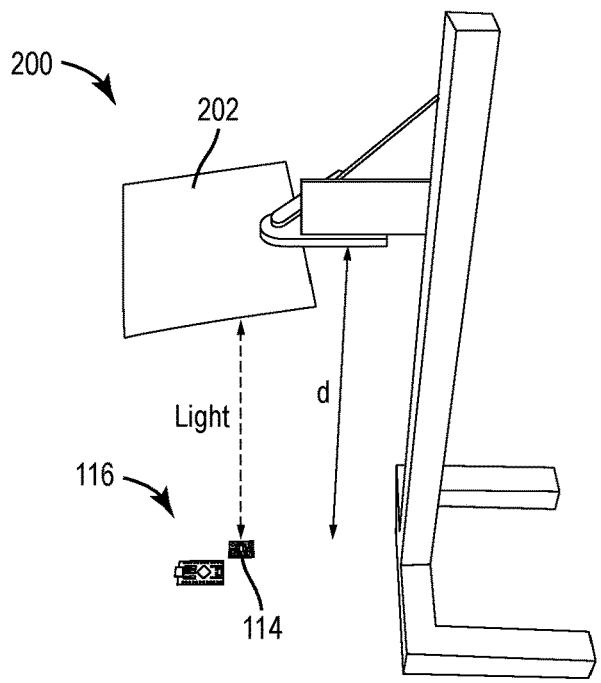
FIG. 9 is an image of a device used to test the LIDAR sensor of FIG. 7, according to an exemplary embodiment.

Referring now to FIG. 9, an image of a sensor testing device 200 is shown, according to an exemplary embodiment. Device 200 was used to test LIDAR sensor 114 to determine whether LIDAR sensor 114 can accurately measure distance. Device 200 was used to place an object 202 a predetermined distance d from LIDAR sensor 114 and LIDAR sensor 114 was used to measure the distance d. The distance d between LIDAR sensor 114 and object 202 was adjusted and LIDAR sensor 114 was again used to measure the adjusted distance d.

Figure 10:
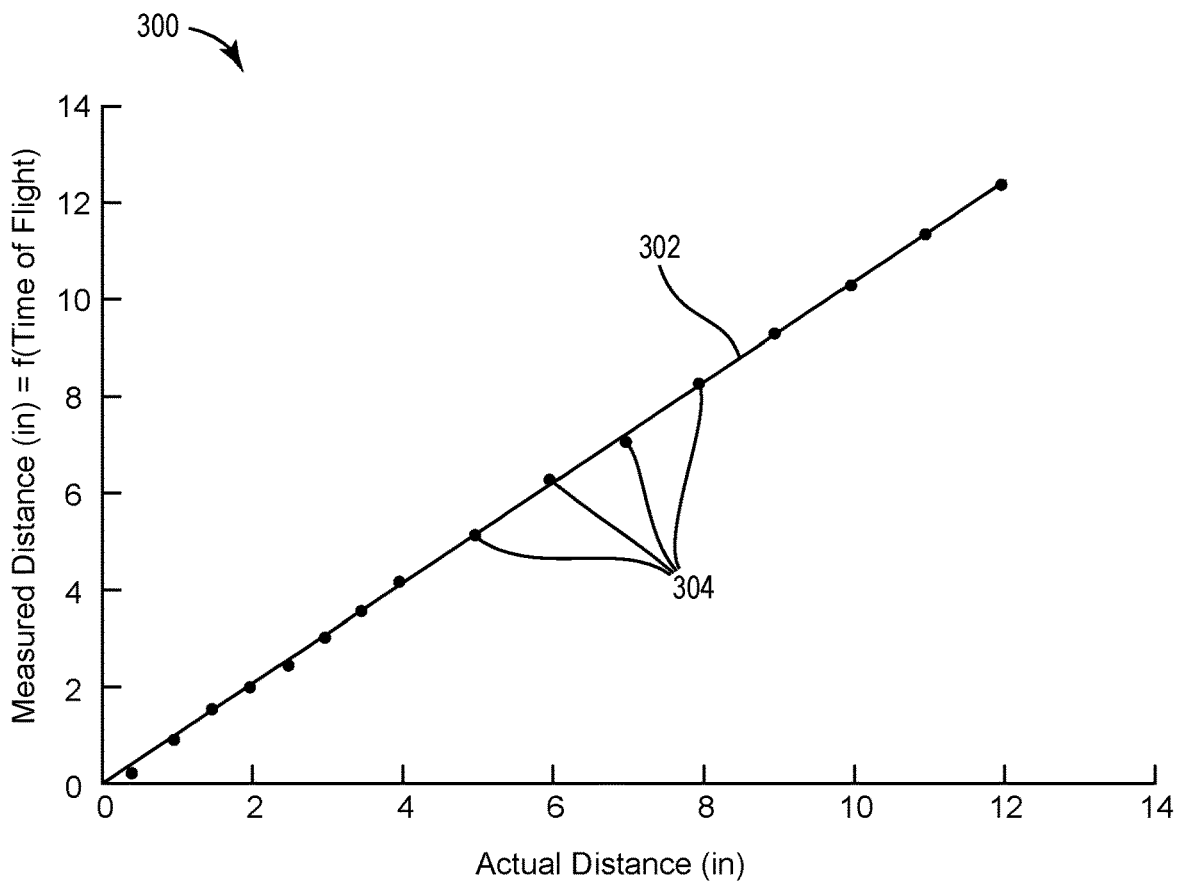
FIG. 10 is a graph illustrating the results of testing the LIDAR sensor of FIG. 7, according to an exemplary embodiment.

Referring now to FIG. 10, a graph 300 illustrating the results of the distance testing is shown, according to an exemplary embodiment. In graph 300, the horizontal axis indicates the actual distance d between LIDAR sensor 114 and object 202, whereas the vertical axis indicates the distance measured by LIDAR sensor 114. The data points 304 represent each of the tests at different distances. Line 302 has a slope of one and correlates highly with data points 304. This indicates that the distance measured by LIDAR sensor 114 is highly accurate to the actual distance.

Figure 11:
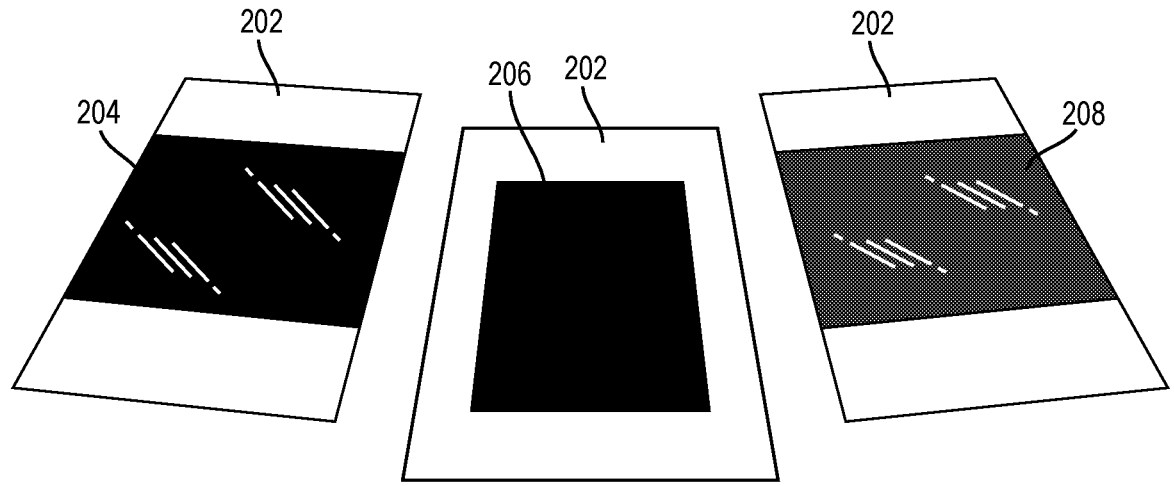
FIG. 11 is an image of several objects having different types of materials and coatings which were tested to demonstrate an insensitivity of the LIDAR sensor to light intensity, according to an exemplary embodiment.

Referring now to FIG. 11, an image of several different objects 202 used to test LIDAR sensor 114 is shown, according to an exemplary embodiment. Each of objects 202 was coated with a different material and/or coating 204, 206, 208 to determine whether the optical characteristics of the object 202 has an effect on measuring efficiency. Material 204 is black and glossy, whereas material 206 is black and matte, and material 208 is gray and glossy. The distance testing demonstrated that the measured distance was not sensitive to material type, color, or the intensity of the reflected light. This insensitivity to light intensity also makes LIDAR sensor 114 unaffected by ambient light such as a sun rise or set. This fundamental difference in detection is the primary benefit to using a LIDAR sensor opposed to an IR sensor.

Sensor Calibration

Figure 12:
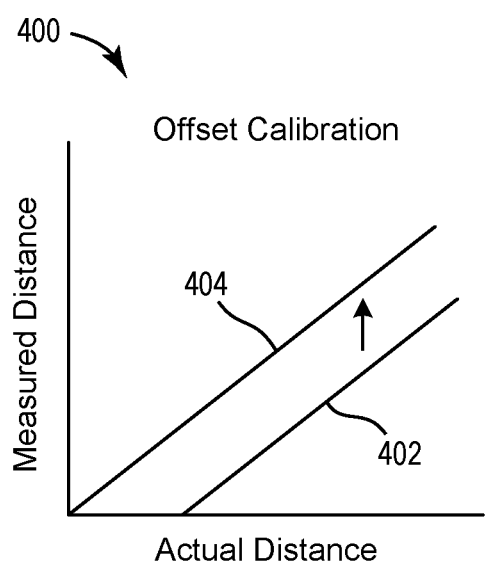
FIG. 12 is a graph illustrating an offset calibration which can be used to calibrate the LIDAR sensor of FIG. 7, according to an exemplary embodiment.
Figure 13:
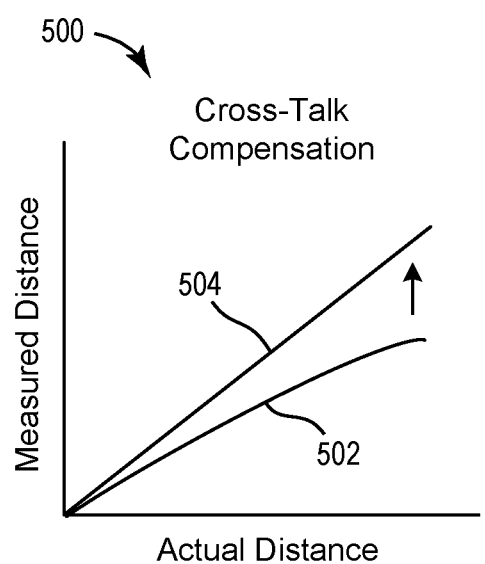
FIG. 13 is a graph illustrating a cross-talk calibration which can be used to calibrate the LIDAR sensor of FIG. 7, according to an exemplary embodiment.

Referring now to FIGS. 12-13, graphs 400 and 500 illustrating the calibration of LIDAR sensor 114 are shown, according to an exemplary embodiment. Graph 400 illustrates an offset calibration which can be performed to increase or decrease the distance measured by LIDAR sensor 114 by an offset amount. The factory settings for LIDAR sensor 114 may provide initial settings for basic functionality of LIDAR sensor 114 out of the box. For example, LIDAR sensor 114 may record the distances in a linear manner. However, there may be a slight offset from the measured values to the actual values. An offset calibration can be performed to re-align the measured distances with the actual distances.

In graph 400, line 402 represents the distance measured by LIDAR sensor 114 as a function of the actual distance, whereas line 404 represents the ideal performance of LIDAR sensor 114 (i.e., measured distance=actual distance). To calibrate LIDAR sensor 114, an offset Δd can be added to the measured distance such that the distance reported by LIDAR sensor 114 aligns with the actual distance.

Graph 500 illustrates a cross-talk calibration which can be performed to adjust the distance measured by LIDAR sensor 114. When a protective lens is placed in the optical path between LIDAR sensor 114 and the detection region (e.g., within window 104 or window 112), the lens may impose a ranging error across the measurable limits of LIDAR sensor 114. To realign and re-linearize the measured distances, a cross-talk calibration can performed.

In graph 500, line 502 represents the distance measured by LIDAR sensor 114 as a function of the actual distance, whereas line 504 represents the ideal performance of LIDAR sensor 114 (i.e., measured distance=actual distance). To calibrate LIDAR sensor 114, the measured distance can be adjusted such that the distance reported by LIDAR sensor 114 aligns with the actual distance. This type of calibration may be used to compensate for distortion due to the optics of dispenser 100.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An automatic paper towel dispenser comprising:
    a dispensing mechanism configured to dispense a paper towel;
    a light detection and ranging (LIDAR) sensor configured to:
    emit light along a path toward an object within a detection region at a first time;
    detect the light reflected by the object substantially along the path at a second time; and
    calculate a time of flight of the light, wherein the time of flight is an amount of time that elapses between the first time and the second time;
    a controller in communication with the LIDAR sensor, the controller configured to:
    calculate a distance between the LIDAR sensor and the object based on the time of flight; and
    actuate the dispensing mechanism based on the calculated distance.

2. The paper towel dispenser of claim 1, wherein the controller is configured to:
    compare the calculated distance to a minimum distance threshold; and
    actuate the dispensing mechanism in response to a determination that the calculated distance is greater than the minimum distance threshold.

3. The paper towel dispenser of claim 1, wherein the controller is configured to:
    compare the calculated distance to a maximum distance threshold; and
    actuate the dispensing mechanism in response to a determination that the calculated distance is less than the maximum distance threshold.

4. The paper towel dispenser of claim 1, wherein the controller is configured to:
    compare the calculated distance to a threshold range of distances; and
    actuate the dispensing mechanism in response to a determination that the calculated distance is within the threshold range of distances.

5. The paper towel dispenser of claim 1, further comprising:
    an outer shell containing the dispensing mechanism, the LIDAR sensor, and the controller; and
    a window in a front surface of the outer shell, the window comprising at least one of:
    an empty hole or aperture; or
    an optically transparent material or lens;
    wherein the LIDAR sensor is configured to emit the light through the window in the outer shell and detect the reflected light returning through the window in the outer shell.

6. The paper towel dispenser of claim 1, further comprising an outer shell;
    wherein the dispensing mechanism, the LIDAR sensor, and the controller are part of an internal unit contained within the outer shell.

7. The paper towel dispenser of claim 1, further comprising a circuit board;
    wherein the LIDAR sensor is mounted on the circuit board.

8. The paper towel dispenser of claim 7, further comprising;
    a protective cover over the circuit board and the LIDAR sensor; and
    a window in the protective cover;
    wherein the LIDAR sensor is configured to emit the light through the window in the protective cover and detect the reflected light returning through the window in the protective cover.

9. The paper towel dispenser of claim 1, further comprising:
    a main circuit board; and
    a secondary circuit board connected to the main circuit board;
    wherein the LIDAR sensor is mounted on the secondary circuit board.

10. An automatic paper towel dispenser comprising:
    a dispensing mechanism configured to dispense a paper towel;
    a light detection and ranging (LIDAR) sensor configured to:
    emit light along a path toward an object within a detection region at a first time;
    detect the light reflected by the object substantially along the path at a second time;
    calculate a time of flight of the light, wherein the time of flight is an amount of time that elapses between the first time and the second time; and
    calculate a distance between the LIDAR sensor and the object based on the time of flight; and a controller in communication with the LIDAR sensor and configured to actuate the dispensing mechanism based on the calculated distance.

11. The paper towel dispenser of claim 10, wherein the controller is configured to:
compare the calculated distance to a minimum distance threshold; and
actuate the dispensing mechanism in response to a determination that the calculated distance is greater than the minimum distance threshold.

12. The paper towel dispenser of claim 10, wherein the controller is configured to:
compare the calculated distance to a maximum distance threshold; and
actuate the dispensing mechanism in response to a determination that the calculated distance is less than the maximum distance threshold.

13. The paper towel dispenser of claim 10, wherein the controller is configured to:
compare the calculated distance to a threshold range of distances; and
actuate the dispensing mechanism in response to a determination that the calculated distance is within the threshold range of distances.

14. An automatic paper towel dispenser comprising:
a dispensing mechanism configured to dispense a paper towel;
a light emitter configured to emit light along a path toward an object within a detection region at a first time;
a light detector configured to detect the light reflected by the object substantially along the path at a second time; and
a processing circuit configured to:
calculate a time of flight of the light, wherein the time of flight is an amount of time that elapses between the first time and the second time; and
actuate the dispensing mechanism based on the calculated time of flight.

15. The paper towel dispenser of claim 14, wherein the processing circuit is configured to:
calculate a distance to the object based on the time of flight; and
actuate the dispensing mechanism based on the calculated distance.

16. The paper towel dispenser of claim 14, wherein the light emitter is configured to emit a focused beam or pulse of laser light.

17. The paper towel dispenser of claim 14, wherein the light emitter is configured to emit a beam or pulse of non-laser light.

18. The paper towel dispenser of claim 14, wherein the processing circuit is configured to:
compare the calculated time of flight to a minimum time of flight threshold; and
actuate the dispensing mechanism in response to a determination that the calculated time of flight is greater than the minimum time of flight threshold.

19. The paper towel dispenser of claim 14, wherein the processing circuit is configured to:
compare the calculated time of flight to a maximum time of flight threshold; and
actuate the dispensing mechanism in response to a determination that the calculated time of flight is less than the maximum time of flight threshold.

20. The paper towel dispenser of claim 14, wherein the processing circuit is configured to:
compare the calculated time of flight to a threshold range of times; and
actuate the dispensing mechanism in response to a determination that the calculated time of flight is within the threshold range of times.

* * * * *